(12) United States Patent
Crevier et al.

(10) Patent No.: US 12,738,779 B2
(45) Date of Patent: Sep. 15, 2026

(54) IN-WHEEL MOTOR WITH IMPROVED HEAT DISSIPATION

(71) Applicant: TIDNAB INNOVATIONS INC., Brossard (CA)

(72) Inventors: Sylvain Crevier, Brossard (CA); Jean I. Tchervenkov, Brossard (CA)

(73) Assignee: TIDNAB INNOVATIONS INC., Brossard (CA)

( * ) Notice: Subject to any disclaimer, the term of this patent is extended or adjusted under 35 U.S.C. 154(b) by 404 days.

(21) Appl. No.: 18/284,931

(22) PCT Filed: Apr. 1, 2022

(86) PCT No.: PCT/CA2022/050501
§ 371 (c)(1),
(2) Date: Sep. 29, 2023

(87) PCT Pub. No.: WO2022/204822
PCT Pub. Date: Oct. 6, 2022

(65) Prior Publication Data

US 2024/0186846 A1 Jun. 6, 2024

Related U.S. Application Data

(60) Provisional application No. 63/169,352, filed on Apr. 1, 2021.

(51) Int. Cl.
*H02K 1/20* (2006.01)
*B60K 1/00* (2006.01)
(Continued)

(52) U.S. Cl.
CPC ................ *H02K 1/20* (2013.01); *B60K 1/00* (2013.01); *B60K 7/0007* (2013.01); *H02K 7/085* (2013.01);
(Continued)

(58) Field of Classification Search
CPC .......... H02K 1/20; H02K 7/085; H02K 11/33; H02K 21/22; H02K 21/222; H02K 7/14;
(Continued)

(56) References Cited

U.S. PATENT DOCUMENTS 5,327,034 A 7/1994 Couture et al.
5,412,269 A 5/1995 Couture
(Continued)

FOREIGN PATENT DOCUMENTS

CN 207753570 U 8/2018
JP 2006246678 A 9/2006
(Continued)

OTHER PUBLICATIONS

Tidnab Innovations Inc., International Patent Application No. PCT/CA2022/050501, International Search Report, Apr. 27, 2022.
(Continued)

*Primary Examiner* — Ahmed Elnakib
(74) *Attorney, Agent, or Firm* — Moore & Van Allen PLLC; Jeffrey R. Gray

(57) ABSTRACT

A wheel assembly comprising a stator and a rotor housing the stator for relative rotation around the stator. The rotor has magnets for interacting with electrical winding of the stator to provide the relative rotation about a central longitudinal axis. The stator has openings extending from a stator proximal side to a stator distal side, and rotation of the rotor around the stator causes an air flow through the openings for heat dissipation. In normal operation of the wheel assembly, the air flows from the wheel assembly proximal side towards the wheel assembly distal side through the openings due to a centrifugal force created during rotation of the rotor around the stator. In an embodiment, an arm used to connect the stator to the chassis of the vehicle comprises through-openings along a longitudinal axis which is parallel to a
(Continued)

movement direction of the vehicle to force air through the through-openings for additional heat dissipation from the stator.

21 Claims, 12 Drawing Sheets

(51) Int. Cl.
*B60K 7/00* (2006.01)
*H02K 7/08* (2006.01)
*H02K 11/33* (2016.01)
*H02K 21/22* (2006.01)

(52) U.S. Cl.
CPC ............. *H02K 11/33* (2016.01); *H02K 21/22* (2013.01); *B60K 2001/006* (2013.01); *B60K 2007/0038* (2013.01); *B60K 2007/0092* (2013.01)

(58) Field of Classification Search
CPC ........ H02K 9/06; H02K 5/207; H02K 7/1846; B60K 1/00; B60K 7/0007; B60K 2001/006; B60K 2007/0038; B60K 2007/0092; B60K 17/356; B60L 2220/44
USPC ............................................................ 310/65
See application file for complete search history.

(56) References Cited

U.S. PATENT DOCUMENTS 9,139,081 B2 9/2015 Tchervenkov et al.
2005/0035678 A1* 2/2005 Ward ...................... H02P 21/06 310/268
2005/0045393 A1 3/2005 Mizutani et al.
2009/0200884 A1* 8/2009 Lafontaine ........... H02K 1/2791 310/156.25
2012/0001521 A1 1/2012 Shiraki et al.
2014/0225550 A1 8/2014 Tchervenkov et al.
2015/0298537 A1* 10/2015 Duhamel ................. H02K 9/16 301/6.5
2016/0134180 A1 5/2016 Tchervenkov et al.
2017/0179803 A1* 6/2017 Li .......................... H02K 11/33
2017/0361900 A1 12/2017 Doerksen et al.

FOREIGN PATENT DOCUMENTS

WO 2013006962 A1 1/2013
WO 2014183205 A1 11/2014

OTHER PUBLICATIONS

Tidnab Innovations Inc., International Patent Application No. PCT/CA2022/050501, Written Opinion, Apr. 27, 2022.
Tidnab Innovations Inc., European Patent Application No. 22778269.5, Extended European Search Report, Jan. 23, 2025.
Tidnab Innovations Inc., International Patent Application No. PCT/CA2022/050501, International Preliminary Report on Patentability, Oct. 12, 2023.

* cited by examiner

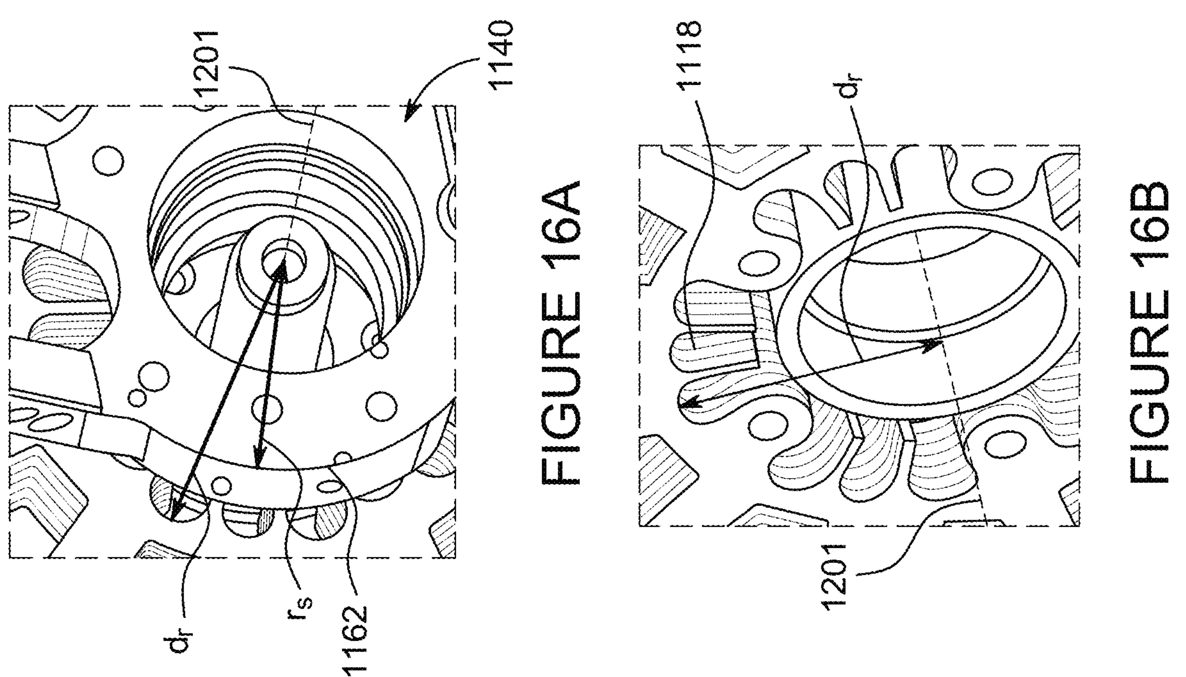
FIGURE 16A
FIGURE 16B
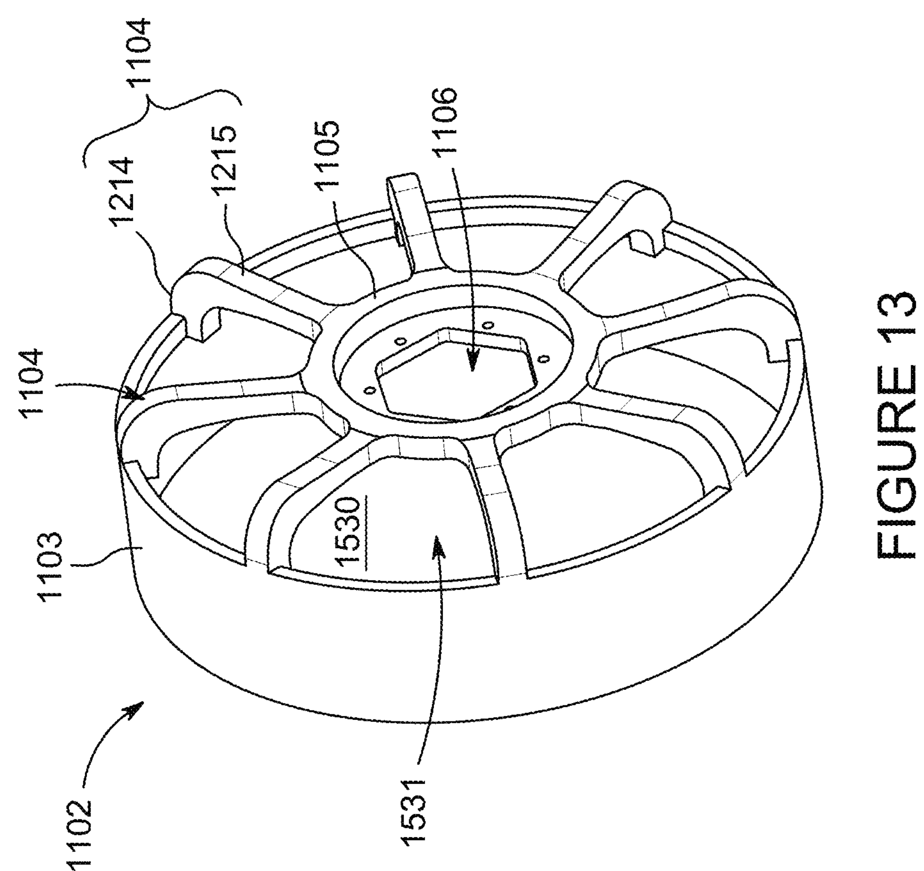
FIGURE 13

IN-WHEEL MOTOR WITH IMPROVED HEAT DISSIPATION

RELATED APPLICATION

The present application is a National Stage Patent Application (filed under 35 § U.S.C. 371) of PCT/CA2022/050501 filed Apr. 1, 2022, which, in turn claims priority to or benefit of U.S. provisional patent application No. 63/169,352, filed Apr. 1, 2021, each of which are incorporated herein by reference in their entirety.

TECHNICAL FIELD

The subject matter disclosed generally relates to an electric in-wheel motor. More specifically, it relates to an electric in-wheel motor with improved heat dissipation.

BACKGROUND

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. The primary problem with conventional gasoline or diesel combustion engines is that they require fossil fuels that are not renewable and contribute to pollution. Consequently, a fuel that is renewable and does not contribute to pollution is desirable.

Hybrid vehicles and electric vehicles are now more widely distributed. However, each of the above vehicles use a central engine/motor and requires a transmission in order to transmit the rotation power from the engine/motor to the wheels.

A typical mechanical transmission for fuel powered vehicles allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction.

No transmission system is ever completely efficient and there is always a percentage of energy lost in friction in the axle, gearing, clutch and the like, especially when the vehicle is equipped with an all-wheel traction mechanism (AWD).

Another problem associated with conventional vehicles is that substantial amount of the car's weight and storage space is taken for the engine/motor and the transmission system, not to mention the maintenance and replacement parts which are provided in large numbers in each vehicle.

Attempts have been made to overcome these problems by providing in-wheel motors whereby one or more wheels in the vehicle would comprise their own motor, thereby alleviating the need for a central motor and a transmission system. An example for such attempts is provided in co-owned and co-invented International Application No. PCT/CA2012/000673. PCT/CA2012/000673 (which is incorporated herein by reference in its entirety) describes a wheel assembly comprising a plurality of stator units coaxially provided within a rotor. The stator units comprise a plurality of spokes co-centrically provided around a hub/shaft and a coil provided around at least a portion of the spokes for generating an electrical field. The rotor comprises a plurality of magnets provided on an inner periphery of the rotor facing the spokes. The rotor is rotatably attached to the hub/shaft of the stator for rotating around the stator units when the coils are activated. The coils and/or the stator units may be selectively activated and deactivated to avoid overheating.

This type of motors reduces the friction losses experienced in a conventional transmission, but they still experience magnetic losses. Additionally, while the overheating in these motors is reduced, it is not completely eliminated and still imposes limitations especially if the type of driving involves extended acceleration and deceleration e.g. if the vehicle is driven in a sport mode or used in racing etc.

Another example for such attempts is provided in co-owned and co-invented International Application No. PCT/CA2014/000437. PCT/CA2014/000437 (which is incorporated herein by reference in its entirety) describes a wheel assembly comprising a wheel-shaped stator plate provided between two wheel-shaped rotor plates, all of which being co-axially attached to a rotation shaft. Each rotor includes a plurality of permanent magnets on the side facing the stator. The stator includes a plurality of coils corresponding in position to the permanent magnets of the rotors. Corresponding magnet faces of the different rotors have opposite orientations, and adjacent magnet faces of the same rotor have also opposite orientations. The rotors are attached to each other to maintain this configuration in place as the rotors rotate. The coils are configured so that each coil generates a magnetic field that extends across the surface of the stator plate to react with corresponding permanent magnets in both rotors, thus maximizing use of the magnetic field generated by the coils and causing the rotor plates to rotate simultaneously. A stream of cooling fluid may be run within the stator plate for reducing overheating.

However, overheating may still occur in the example described in PCT/CA2014/000437. In all cases, for greater safety during use and for improved sustainability of the parts used in the engine, there is a benefit in ensuring that the engine is sufficiently cooled down during operation. Therefore, there is a need for an improved wheel motor which is efficient and also allows for extended use without overheating.

SUMMARY

It is an object of the present disclosure to provide an in-wheel motor and a wheel assembly with improved heating dissipation. It is also an object of the present disclosure to provide a method of cooling an in-wheel motor and a wheel.

According to one aspect of the disclosed technology, there is provided a wheel assembly comprising: a stator comprising a spacing for accommodating an electrical winding; and a rotor having an outer ring and spokes extending from a hub, the rotor housing the stator for relative rotation with respect to the stator, the rotor comprising magnets for interacting with the electrical winding to provide the relative rotation about a central longitudinal axis, the central longitudinal axis extending from a wheel assembly proximal side to a wheel assembly distal side; wherein the stator comprises openings extending from a stator proximal side to a stator distal side, to allow an air flow through the openings. In at least one embodiment, the air flow is from the wheel assembly proximal side towards the wheel assembly distal side though the openings. In at least one embodiment, the air flow may be from the wheel assembly distal side towards the wheel assembly proximal side though the openings.

In at least one embodiment, the spokes and the outer ring form spoke apertures at least partially coinciding with the openings for air communication and exhaust from the wheel assembly. In at least one embodiment, the spokes and the outer ring form spoke apertures at least partially coinciding with the openings for air communication and exhaust from the wheel assembly proximal side to the wheel assembly distal side.

According to at least one embodiment, each spoke of the spokes comprises a radial spoke portion attached to and extending radially from a hub toward an outer ring, and a spoke gap portion, the spoke gap portion supporting the radial spoke portion and configured to form a gap between the stator and the hub with attached radial spoke portions attached to the hub.

According to at least one embodiment, the wheel assembly further comprises a cover positioned coaxially with the rotor on a distal side of the rotor to cover an area about the central longitudinal axis, the cover, the spokes and the outer ring forming gap apertures for air exhaust on the distal side around a periphery of the cover. According to at least one embodiment, the wheel assembly further comprises a bearing carrier at an interface between the stator and the rotor, a static portion of the bearing carrier being secured to a chassis support of a vehicle, the chassis support comprising at least one chassis support hole having chassis support hole axis being parallel to a direction of movement of the vehicle to allow airflow therethrough when the vehicle moves. In at least one embodiment, the chassis support comprises at least one chassis arm having the at least one chassis support hole. In at least one embodiment, at least one of the at least one chassis support hole is located in a body of the chassis support. In at least one embodiment, an outer radius of a middle body of the chassis support is smaller than a depth of the opening calculated from the central longitudinal axis of the wheel assembly.

In at least one embodiment, the stator comprises a plurality of T-shaped peripheral arms, each of the T-shaped peripheral arms extending radially away from the center longitudinal axis, and each pair of adjacent T-shaped peripheral arms forming, between them, the spacing for the electrical winding. In at least one embodiment, the stator comprises a plurality of stator plates having identical shape and assembled with the same angular orientation with respect to the central longitudinal axis.

In at least one embodiment, each opening of the openings is a recess extending from a central opening of the stator towards a periphery of the stator. In at least one embodiment, two adjacent openings form an opening wall therebetween and each opening is a recess extending radially from the central longitudinal axis. In at least one embodiment, the bearing carrier is mounted within a central opening of the stator and the opening wall of the stator is adjacent to the bearing carrier.

According to another aspect of the disclosed technology, there is provided a wheel assembly comprising: a stator comprising a spacing for receiving an electrical winding; and a rotor defining an outer ring, the rotor housing the stator for relative rotation around the stator, the rotor comprising magnets for interacting with the electrical winding to provide the relative rotation about a central longitudinal axis; wherein the stator comprises openings extending from a stator proximal side to a stator distal side; and wherein rotation of the rotor around the stator causes an air flow through the openings for heat dissipation.

According to at least one embodiment, the air flows from the wheel assembly proximal side towards the wheel assembly distal side through the openings. In at least one embodiment, the rotor defines a hub and spokes extending from said hub, the spokes being distant to provide openings from which the air flows during rotation. In at least one embodiment, rotation of the spokes creates a centrifugal force that pushes the air found within the wheel assembly radially outwardly, away from an axial center thereof.

According to at least one embodiment, the wheel assembly further comprises a cover covering at least the hub, and defining a free space with the rotor such that the air flow is forced to traverse through the stator and to be exhausted through the free space between the cover and the rotor. According to at least one embodiment, the wheel assembly further comprises an arm for connecting the stator to a chassis of a vehicle, the arm having through-openings along a longitudinal axis which is parallel to a movement direction of the vehicle to force air through the through-openings for additional heat dissipation from the stator.

According to another aspect of the disclosed technology, there is provided a wheel electric engine comprising the wheel assembly further comprising a processor configured to drive electric current to the electrical winding.

According to another aspect of the disclosed technology, there is provided a vehicle comprising: a chassis; at least one wheel assembly, the at least one wheel assembly being attached to the chassis; and a processor configured to drive electric current to the electrical winding of the at least one wheel assembly for controlling rotation of the wheel assembly.

BRIEF DESCRIPTION OF THE DRAWINGS

Further features and advantages of the present disclosure will become apparent from the following detailed description, taken in combination with the appended drawings, in which:

FIG. 13 is a perspective view of a rotor of the advanced wheel assembly of FIG. 11;

FIG. 16A is an enlarged view of a portion of FIG. 11, illustrating a depth of a recess of the stator; and FIG. 16B is an enlarged view of a portion of FIG. 15 illustrating the depth of the recess of the stator.

It will be noted that throughout the appended drawings, like features are identified by like reference numerals.

DETAILED DESCRIPTION

Figures 1, 2:
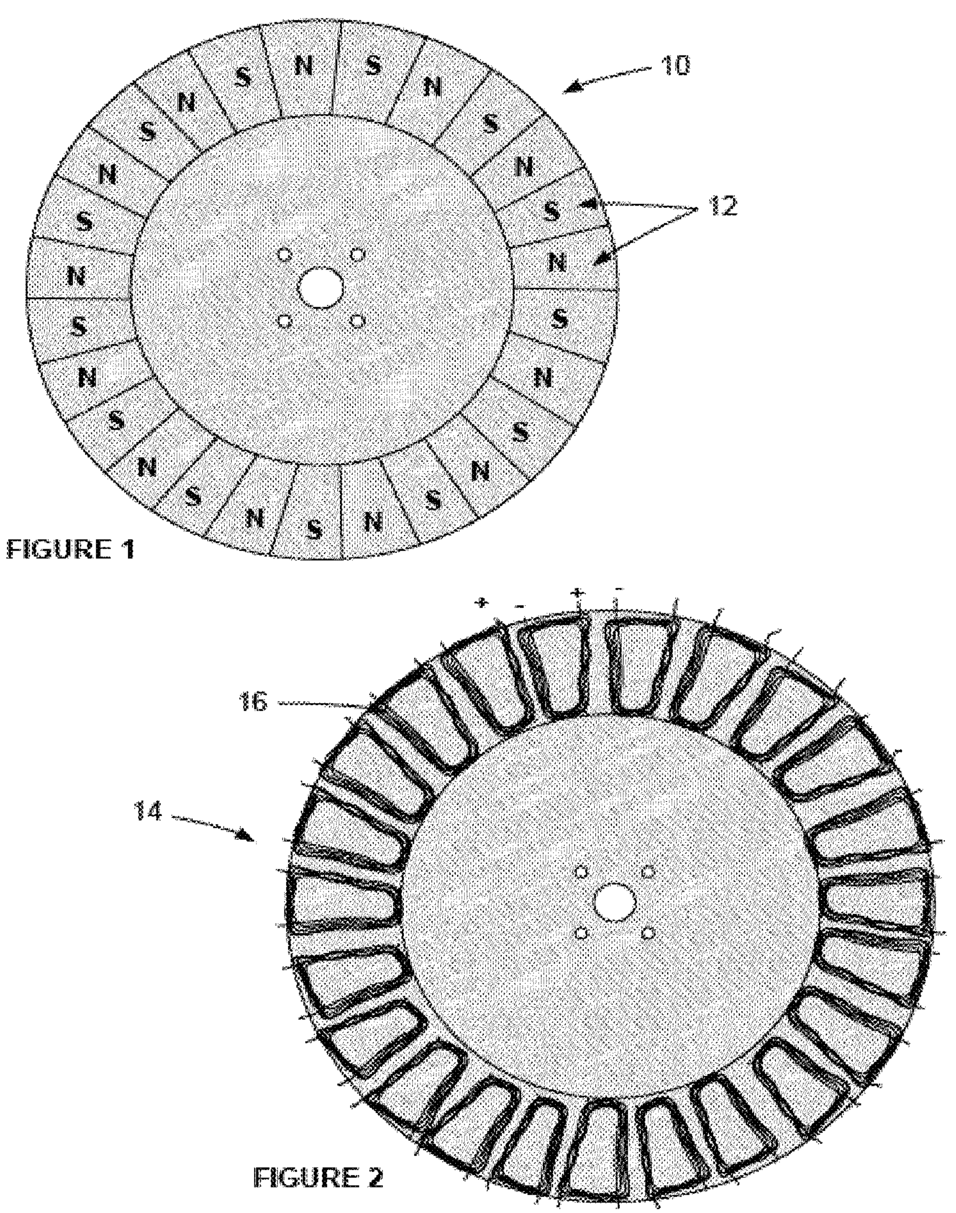
FIG. 1 is a top view of a rotor plate of an exemplary conventional wheel assembly, according to the prior art.
FIG. 2 is a top view of a stator plate of an exemplary conventional wheel assembly, according to the prior art.

There is described a wheel assembly comprising a stator and a rotor housing the stator for relative rotation around the stator. The rotor has magnets for interacting with electrical winding of the stator to provide the relative rotation about a central longitudinal axis. The stator has openings extending from a stator proximal side to a stator distal side, and rotation of the rotor around the stator causes an air flow through the openings for heat dissipation. In normal operation of the wheel assembly, the air flows from the wheel assembly proximal side towards the wheel assembly distal side through the openings due to a centrifugal force created during rotation of the rotor around the stator. In an embodiment, an arm used to connect the stator to the chassis of the vehicle comprises through-openings along a longitudinal axis which is parallel to a movement direction of the vehicle to force air through the through-openings for additional heat dissipation from the stator.

The embodiments describe a wheel assembly defining a wheel motor (also called in-wheel motor, wheel hub motor, wheel hub drive, or hub motor) and comprising a stator plate which is generally wheel-shaped and having particularities of shape detailed below which contribute to heat dissipation by ensuring that the engine, during operation, acts as an air pump which pumps air therethrough to cool down the engine. Other components described further below, such as a cover, contribute to the forcing of airflow through the wheel assembly during operation to contribute to the heat dissipation.

The stator is provided within a rotor which houses the stator therein, all of which are co-axially arranged around a rotation shaft defining a central longitudinal axis. This axis extends from a proximal side (e.g., toward the vehicle when installed) to a distal side opposite the proximal side. The rotor includes a plurality of permanent magnets on the inner side facing the stator.

The stator includes a plurality of coils corresponding in position to the permanent magnets of the rotors. Corresponding magnet faces of the rotor have opposite orientations, and adjacent magnet faces of the same rotor have also opposite orientations. The coils are configured so that each coil generates a magnetic field that extends across the surface of the stator plate to react with corresponding permanent magnets in the rotor, causing the rotor to rotate simultaneously.

The wheel assembly may have the shape of a thin wheel and, advantageously, may be embedded within existing rims/wheels. Additional layers of rotors and stators may be provided for increasing torque and/or horsepower. This allows for building powerful vehicles with minimal amounts of energy losses.

The in-wheel electric engine described herein may rely on some of the components and principles used in state-of-the-art devices, which will be described briefly below in relation with FIGS. 1-10 to ensure that the basic working of the in-wheel engine is described, before describing in greater detail the specificities of the embodiments of the invention in relation with FIGS. 11-15, further below.

FIG. 1 is a top view of a state-of-the-art rotor plate of an exemplary wheel assembly. As shown in FIG. 1, the rotor plate 10 defines a wheel shaped plate comprising a plurality of magnets 12 (e.g., permanent magnets, rare earth magnets, neodymium magnets) at or in proximity of the edge. In an embodiment, the magnets 12 are arranged beside each other so that adjacent magnet poles have opposite polarities e.g. north, south, north, south, etc. as shown in FIG. 1.

FIG. 2 is a top view of a state-of-the-art stator plate (conventional stator plate) of an exemplary wheel assembly (also referred to herein as a "conventional wheel assembly"). As shown in FIG. 2, the conventional stator plate 14 comprises a plurality of coils 16 provided at or in proximity of the edge. The coils may be provided in openings and/or cutouts provided in the conventional stator plate 14 so as to correspond to the magnets 12 of the rotor plate 10.

Figure 3:
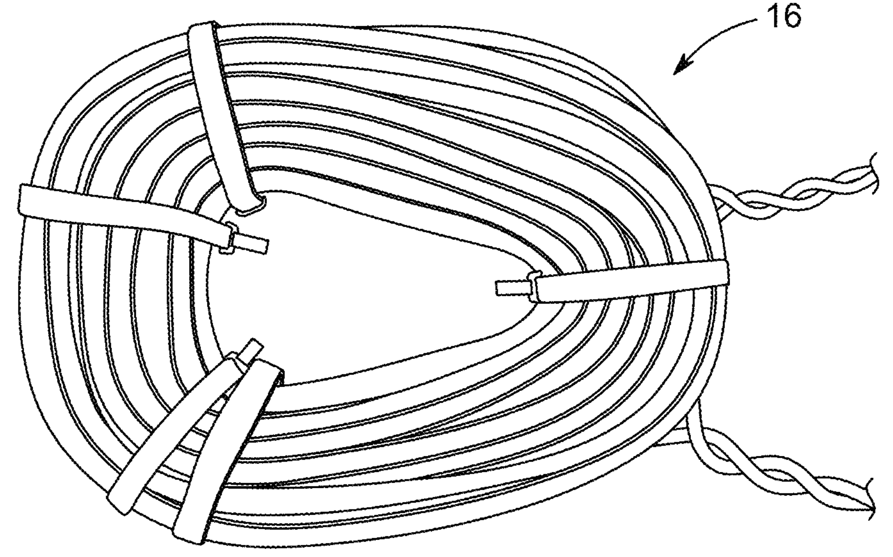
FIG. 3 is a top view of triangular shaped coil in accordance with an embodiment, according to the prior art.
Figure 4:
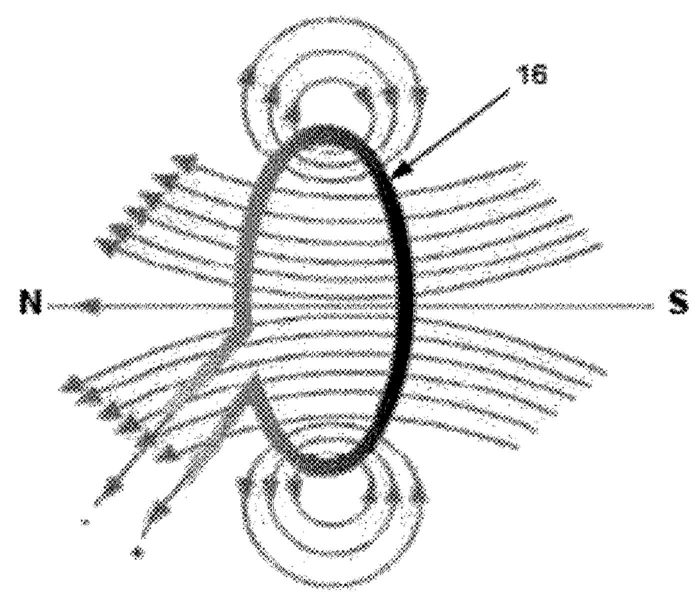
FIG. 4 is a diagram that illustrates the magnetic fields generated by a coil, according to the prior art or to an embodiment.

In an embodiment, the coils 16 may have a trapezoidal shape as shown in FIG. 2, or a triangular shape as illustrated in FIG. 3. Other shapes are also possible without departing from the scope of the disclosure. When an electric current is fed into the coil 16, a magnetic field is generated which is substantially perpendicular to the plane that is defined by the coils 16, as illustrated in FIG. 4.

Figure 5:
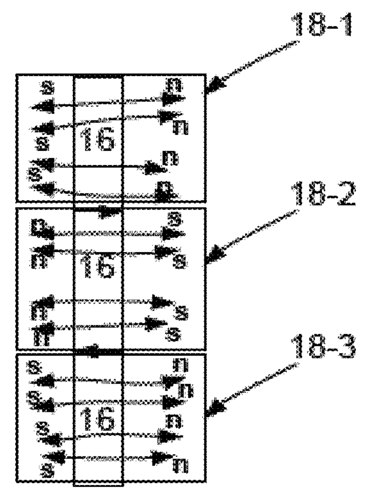
FIG. 5 is a diagram that illustrate the magnetic fields generated by a conventional stator plate, according to the prior art.

In an embodiment, the coils 16 may be wired so that adjacent coils 16 receive electric currents with opposite polarities. For example, a sinusoidal/square-shaped current may be fed into a given coil and a de-phased (shifted) version of the same current may be fed into the adjacent coil such that the magnetic fields generated by adjacent coils may have different directions as shown in FIG. 5 which illustrates different magnetic fields 18-1 to 18-3 having opposite directions. In an embodiment, a controller may be used for generating the electric current for the different coils using a DC battery such as a lithium battery, acid based battery and so on.

Figure 6:
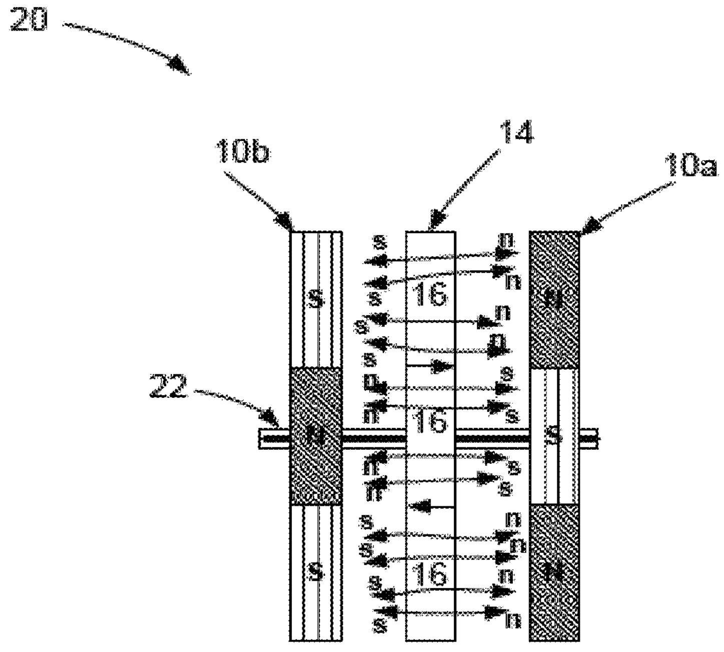
FIG. 6 is a top view of a non-limiting example of stator-rotor arrangement in a conventional wheel assembly, according to the prior art.

FIG. 6 is a top view of a non-limiting example of a prior-art, or state-of-the-art wheel assembly (conventional wheel assembly) to better understand the workings thereof. As shown in FIG. 6, the conventional wheel assembly 20 comprises a conventional rotor comprising conventional rotor plates 10*a* and 10*b*, and a conventional stator unit 14 provided between the conventional rotor plates 10*a* and 10*b*. The conventional rotor plates 10 rotate around a shaft 22 using bearings or the like. Other arrangements are also possible whereby the conventional rotor plates 10 may be connected to a rotation shaft while the conventional stator plate 14 is connected to the chassis of the vehicle.

As shown in FIG. 6, the conventional wheel assembly 20 of the prior art has conventional rotor plates 10 that may be installed so that the corresponding magnets of the conventional rotor plate 10*a* face magnets having opposite polarities of the conventional rotor plate 10*b*. In operation, when the electric current is fed into the coils 16, a magnetic field is generated as discussed above which repels the magnets 12 of both conventional plates 10*a* and 10*b*, thus, causing rotation of the conventional rotor plates 10*a* and 10*b* around the shaft 22. Accordingly, the present arrangement causes both poles of the magnetic field (north and south) to be utilized, thus, reducing energy losses in the conventional wheel assembly 20. Furthermore, due to the rotation of the conventional rotor plates 10*a* and 10*b* around the conventional stator plate 14, automatic ventilation is generated which dissipates the heat from the coils 16 and the magnets 12.

Figure 7:
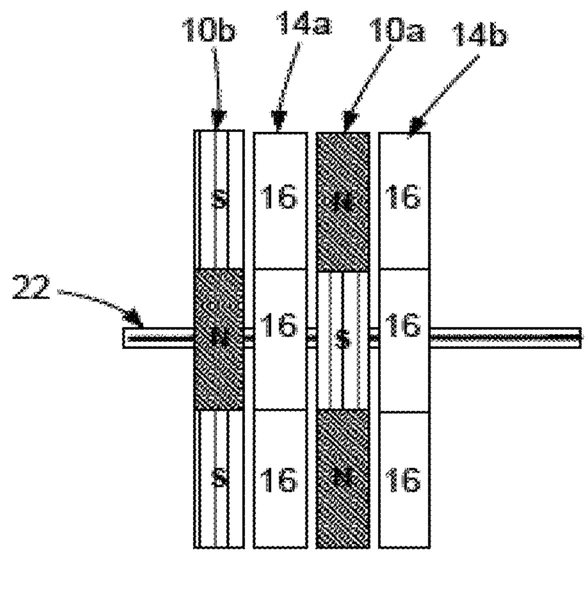
FIG. 7 is a top view of another example of a conventional wheel assembly, according to the prior art.
Figure 8:
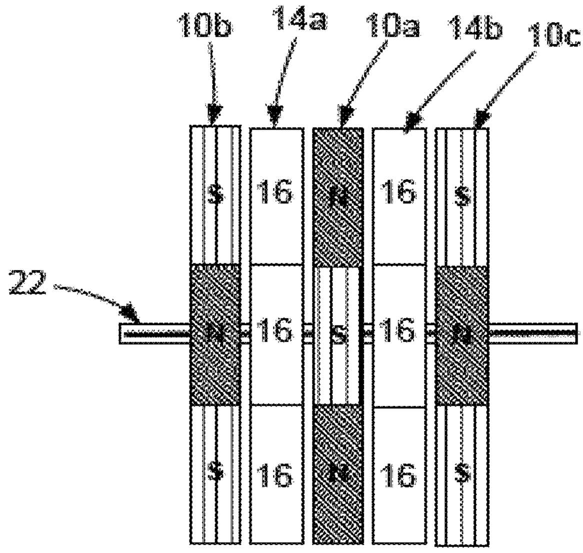
FIG. 8 is a top view of yet another example of a conventional wheel assembly, according to the prior art.

If more power/torque is needed, an additional stator plate 14*b* may be added as exemplified in FIG. 7. However, in order to optimally benefit from the electric current injected into the conventional stator unit 14*b*, an additional conventional rotor plate 10*c* would have to be added as exemplified in FIG. 8.

The wheel assembly 1100 (also referred to herein as an "advanced wheel assembly 1100" or a "motor assembly 1100"), according to an embodiment of the present invention, described further below and illustrated in FIG. 11, can take advantage of the same type of physical principles to be operated using a controlled electrical current through an arrangement of coils and magnets. However, it will be appreciated further below that the advanced wheel assembly 1100 according to an embodiment of the invention is herein described with a single rotor with an inner stator inside the rotor. Otherwise, it will be appreciated by the person skilled in the art that the principles for operation, using oils and magnets, of the wheel assembly 1100 according to an embodiment of the invention, described further below are similar as in the state-of-the-art wheel assemblies. In other terms, the advanced wheel assembly may comprise two or more stators positioned next to each other, and a corresponding number (two or more) of rows of magnets located on a periphery of the rotor to achieve rotation of the rotor with respect to the stator inside the rotor.

Figure 9:
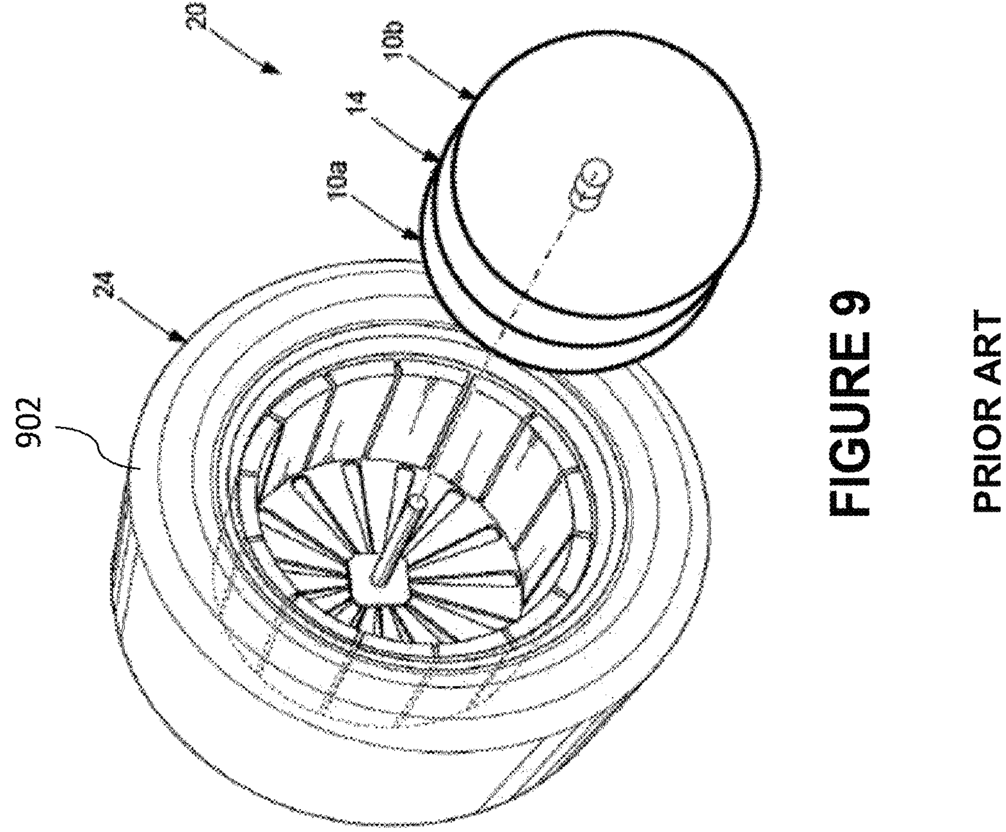
FIG. 9 is an exploded view of a rim/wheel with the conventional wheel assembly embedded therein, according to the prior art.

Referring now to FIG. 9, the conventional wheel assembly 20 may be provided within an existing rim/wheel 24 (sometimes referred to as "rim" or "wheel") as exemplified in FIG. 9, wherein the conventional stator plate 14 may be connected to the chassis of the car and the rim/wheel 24 may be connected to the rotor plates 10 so that the rim/wheel 24 rotates as a result of the electric current fed into the coils 16 of the conventional stator plate 14. Other arrangements are also possible without departing from the scope of the present disclosure.

The rotor plates as described herein below may be made from non-magnetized and preferably light metals such as aluminum, fiber glass, plastic, wood, or a composite material that is permeable to magnetic waves.

A vehicle including the advanced wheel assembly 1100 in accordance with the present embodiments may be lightweight and may have a larger storage capacity since the central motor and transmission are not present.

Figure 10:
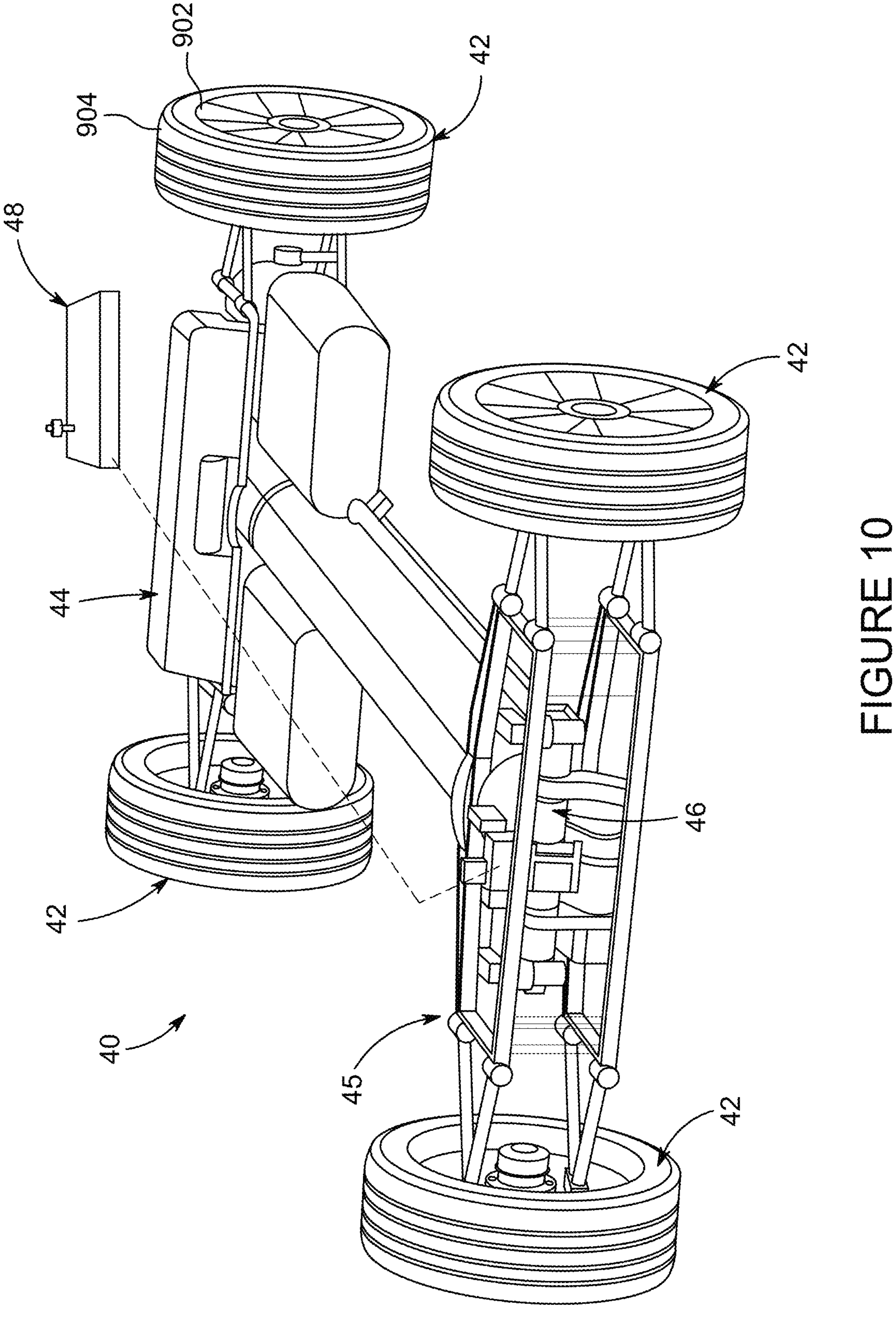
FIG. 10 illustrates an example of a vehicle including at least one wheel having an advanced wheel assembly embedded therein, t according to an embodiment.

FIG. 10 illustrates an example of a vehicle including at least one wheel having the advanced wheel assembly 1100 embedded therein, in accordance with an embodiment of the present disclosure. As shown in FIG. 10, a vehicle 40 comprises a plurality of wheels 42 (which include the tires). The wheels are connected to a chassis 45. At least one of these wheels 42 comprising the electric conventional wheel assembly 20 or the advanced wheel assembly 1100 may be embedded therein (but not shown in FIG. 10). In an embodiment, all four wheels 42 are provided with the advanced wheel assembly 1100 embedded therein. In another embodiment, the rear or front wheels 42 are provided with the advanced wheel assembly 1100 embedded therein. In an embodiment, all four wheels 42 are provided with a wheel assembly 20 embedded therein. In another embodiment, the rear or front wheels 42 are provided with the wheel assembly 20 embedded therein. Other combinations and numbers of engines are possible. Even if FIG. 10 shows the vehicle 40 having four wheels, the technology as described herein may be used in three-wheel vehicles (such as go-cars, for example), two-wheel vehicles (such as, for example, motorcycles), or any other type of a vehicle with any number of wheels.

According to an embodiment, the vehicle 40 comprises a battery 44. The battery 44 may be charged by plugging into a power source in a wall or by a generator/break system/solar panel or the like on board of the vehicle 40 using known techniques. The wheels 42 do not require a conventional transmission system to rotate, and may be individually controlled by a central computer 46 to accelerate and decelerate them by varying the current intensity using an electric switch 48. The central computer 46 comprises a processor and a memory storing instructions to be executable by the processor. Thus, the wheel electric engine (which may be also referred to as "wheel motor" or "in-wheel motor") comprises the advanced wheel assembly 1100 and a processor configured to drive electric current to the electrical windings 16.

The advanced wheel assembly 1100 may be used in a variety of different applications including but not limited to windmills, electric pumps, cars, motorcycles etc.

In another embodiment, the wheels with the advanced wheel assembly 1100 may be used for generating electricity. For example, the wheels with the advanced wheel assembly 1100 may be used for braking electromagnetically by converting the kinetic energy of the car into an electric current which may be used for charging the battery of the car. It should also be noted that use of the advanced wheel assembly 1100 for the generation of electricity is not limited to vehicles. The advanced wheel assembly 1100 may be used in hydro-electric turbines, and wind turbines for generating energy from renewable sources.

Now referring to FIGS. 11-15, a non-limiting example of an in-wheel electric engine is now described. In this example, components are arranged in a way to ensure efficient heat dissipation, especially by improving airflow (more specifically by forcing airflow as caused by the rotation of the engine thanks to the arrangement described herein) through the engine to reduce the engine temperature during operation by this forced convection.

Figure 15:
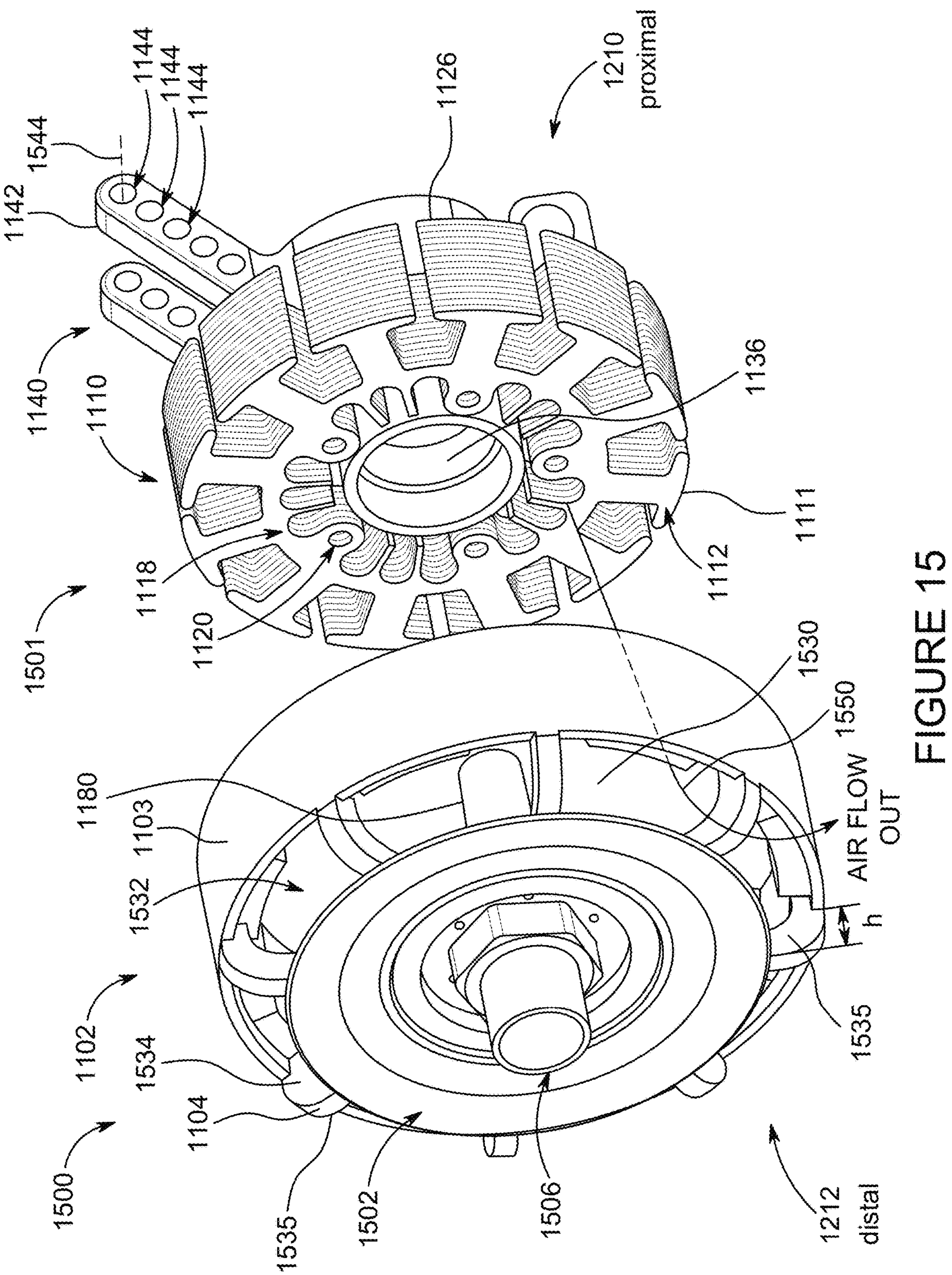
FIG. 15 is a semi-exploded view of the advanced wheel assembly showing a rotative portion (assembled) to be paired with a static portion (also assembled), further showing a cover and a bolted rotative shaft on the rotative portion, in accordance with an embodiment.

FIG. 15 is a semi-exploded view of the advanced wheel assembly 1100. There is shown a rotating portion 1500 on the left, which undergoes a relative rotation with respect to the static portion 1501 on the right of FIG. 15. The movement is relative, and the roles of rotating and static portions can be interchanged depending on the referential. In other terms, in some embodiments, the rotating portion 1500 may be static, while the static portion 1501 may rotate.

Figure 12:
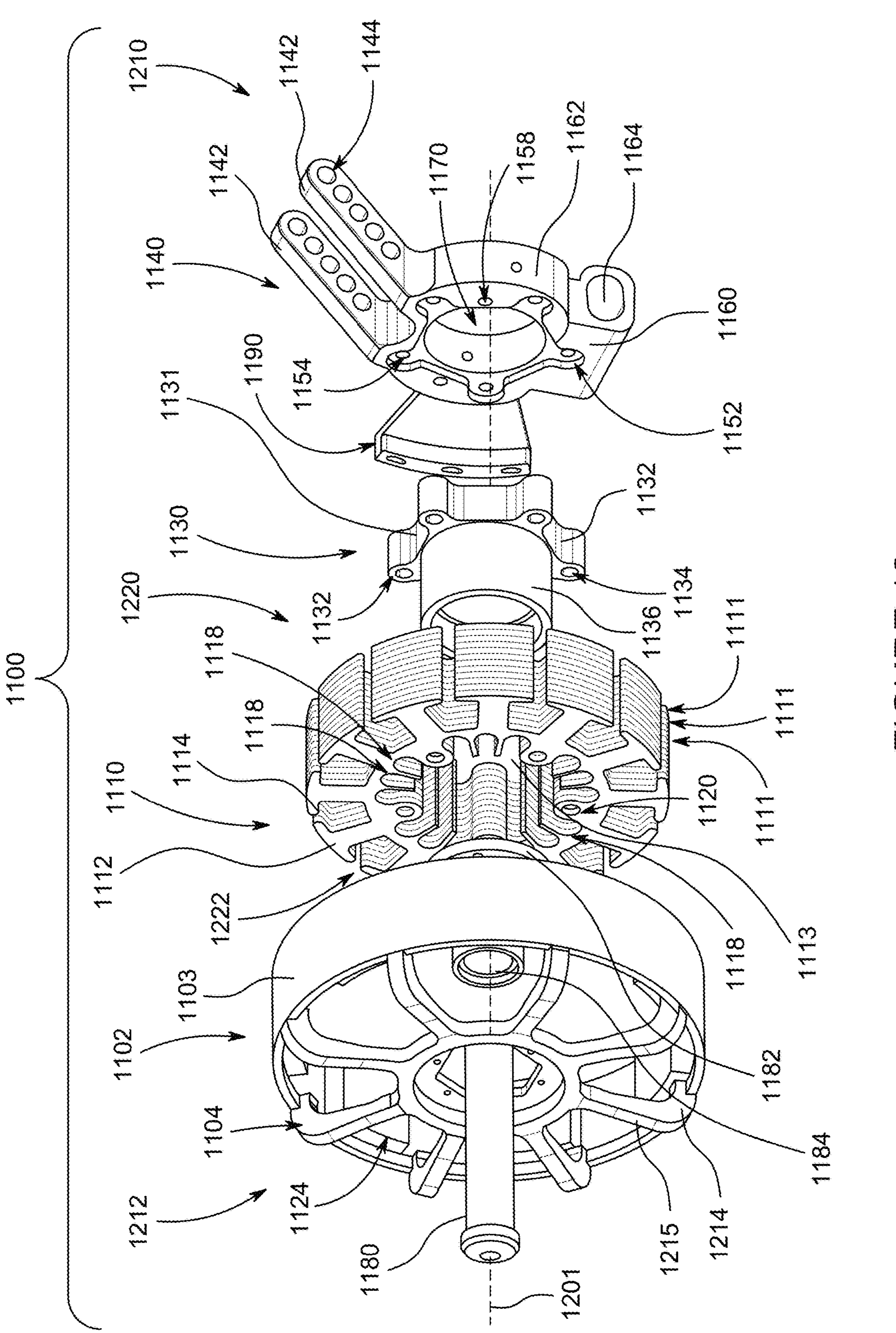
FIG. 12 is an exploded view of the advanced wheel assembly of FIG. 11.

To put it briefly, the rotating portion 1500 comprises a rotor 1102, while the static portion 1501 comprises the stator 1110 and the chassis support 1140 (best shown in the exploded view of FIG. 12). According to an embodiment, the chassis support 1140 may also include attachment means such as an arm 1142 (also referred to herein as "chassis arm 1142"), or more than one arm 1142 such as a pair of arms 1142 (i.e., two of them) for attaching the wheel assembly 1100 to the chassis of the vehicle. Other means are also possible which are known in the art and which are outside the scope of this disclosure.

The rotor 1102, in accordance with an embodiment of the present disclosure, is well shown in FIG. 13. It comprises an outer ring 1103 of the rotor 1102. According to an embodiment, the outer ring 1103 is secured to a rim 902 (as illustrated in FIG. 9) of the wheel 42 which is spinning, i.e., the outer ring 1103 is the end component which drives the rim and tires of the vehicle being motorized by the motor assembly. The tire 904 may be installed on the rim 902, as illustrated in FIG. 17.

According to an embodiment, the rotor 1102 further comprises a hub portion 1105 which is generally centrally located, and which comprises a central bore 1106 through which a rotating shaft 1180 can be inserted and secured. Spokes 1104 can be used to connect the outer ring 1103 to the hub portion 1105.

The rotating shaft 1180, illustrated in FIG. 12, has a central axis that coincides with a central longitudinal axis 1201.

The rotating portion 1500 further comprises the rotating shaft 1180, which according to an embodiment, is inserted through the central bore 1106 of the rotor 1102 (which is best shown in FIG. 13).

As shown in FIG. 15, there may be provided a cover 1502 onto the outer portion of the rotor 1102. The cover 1502 will be discussed further below in greater detail.

Since both the rotor 1102 and the rotating shaft 1180 are in rotation together, they are secured together. According to an embodiment, this can be done by bolting the rotating shaft on the rotor 1102. According to a more particular embodiment, as shown in FIG. 15, this can be done by bolting rotating shaft with a nut 1506 having a central bore to let the rotating shaft 1180 extend therethrough, the nut thereby sandwiching the cover 1502 between said nut 1506 and the rotor 1102, thereby simultaneously securing the cover 1502 together with the rotor 1102 in a fixed manner.

Within the rotor 1102, e.g., within the inner surface of the outer ring 1103, there are provided magnets 1124, preferably permanent magnets, which are sequentially provided along an inner periphery of the rotor 1102 and which, in the wheel assembly 1100 as assembled, are directly opposing the outward peripheral end of the stator plates 1111, discussed below. According to an embodiment, only half of the magnets are shown in FIG. 11-12 or 14-15 (i.e., every other one of the magnets is shown), i.e., magnets completely cover the inner surface of the rotor 1102 without interruption in the sequence.

Referring to FIG. 12, the central longitudinal axis 1201 extends from a proximal side 1210 (toward the vehicle when installed, also referred to herein as a "wheel assembly proximal side" or a "motor assembly proximal side") to a distal side 1212 (also referred to herein as a "wheel assembly distal side" or a "motor assembly distal side") opposite the proximal side 1210. The rotor 1102 houses the stator for relative rotation with respect to the stator. The stator 1110 has spacings 1114 for accommodating the electrical winding, also referred to herein as a coil 16, and illustrated in FIG. 3. The rotor 1102 comprises magnets 1124 for interacting with the electrical winding to provide the relative rotation about a central longitudinal axis 1201, the central longitudinal axis extending from the proximal side 1210 to the distal side 1212 of the motor assembly 1100.

At the interface between the rotating portion 1500 and the static portion 1501, there is further provided a bearing 1182, shown in FIG. 12, through which the rotating shaft 1180 is inserted and housed in a central bore 1184 of the bearing 1182 for rotation therein. Typically, the bearing is expected to comprise rotating balls therein which allow a relative movement of the inside cylinder of the bearing with respect to an outer cylinder of the bearing. Therefore, the outer cylinder of the bearing may be secured to the static portion 1501 while the inner cylinder of the bearing has the bore 1184 housing the rotating shaft 1180 and rotates with the rotating shaft 1180. Thus, the bearing 1182 makes up the interface between the rotative portion 1500 and the static portion 1501.

According to an embodiment, bearing 1182 is housed in the static portion 1501 by a bearing carrier 1130, best shown in FIG. 12. The bearing carrier 1130 is static and is secured to the chassis support 1140. The bearing carrier 1130 comprises a housing 1136 which houses the outer cylinder of the bearing 1182 therein, as shown in FIGS. 12 and 15. Therefore, the inside of the housing 1136 is a cylinder slightly larger than the outer cylinder of the bearing 1182 to accommodate this component therein in a fixed manner.

According to an embodiment, the bearing carrier 1130 is fixed to the chassis support 1140 using bearing carrier arms 1132 which extend radially away from the proximal base 1131 of the bearing carrier 1130, as well shown in FIG. 12. Longitudinal holes 1134 may be provided, again, as shown in FIG. 12, to screw, pin, bolt, or otherwise secure the bearing carrier 1130 to the chassis support 1140.

Accordingly, the chassis support 1140, best shown in FIG. 12, comprises a chassis support recess 1152 formed within a surface of its body 1160 to receive the proximal base of the bearing carrier 1130, including the radially-extending bearing carrier arms 1132. Holes 1154 may be provided to be aligned with the holes 1134 of the bearing carrier 1130 when installed in the chassis support recess 1152 of the chassis support 1140 for common insertion of a screw, pin, or any other equivalent thereof to secure these parts together.

As well shown in FIG. 12 or 15, and already mentioned above, the chassis support 1140 further comprises arms 1142 which connect to the chassis 45 or any other equivalent static and solid portion of the vehicle having the wheels which are motorized. According to an embodiment, this arm or these arms 1142 comprise one or more (at least one) through-opening(s) 1144 (which may be also referred to as "arm holes") which traverse the width of the arms 1142. These through-openings 1144 create additional surface of the chassis support with the surrounding air. More specifically, the arm holes 1144 are through-holes allowing the passage of an airflow therethrough (i.e., a tunnel open at both ends) which is in the direction of movement of the vehicle having the motorized wheels. It means that when the vehicle is moving (under the effect of the wheel motor which generates heat), there is generated an airflow though the through-openings 1144 of the arms which contribute to the evacuation of the heat therefrom, i.e., the multi-pierced arms 1142 serve as a heat spreader. The arm holes 1144 are through-holes each extend parallel to the motion of the vehicle, and therefore chassis. In other terms, in an embodiment, the arm holes 1144 may be hollow cylinders. Each arm hole 1144 may have an arm hole central axis 1544 oriented parallel to the direction of movement of the vehicle, which is parallel (or approximately parallel) to the surface of the ground on which the vehicle is moving and perpendicular (or approximately perpendicular to the rotating shaft 1180). In at least one embodiment, the angle of the arm hole central axis 1544 may slightly vary as long as the angle allows the air to travel through the arm holes 1144 and allow the heat dissipation.

As shown in FIG. 12, the body 1160 of the chassis support 1140 may further comprise a channel 1164 formed through the body 1160, with the same properties as the through-openings 1144, and serving a similar purpose. It may also comprise a support element 1190 which provides additional support or may be used to input electrical current or the like, or to provide braking capabilities, etc.

According to an embodiment, the chassis support 1140 is formed of a material of high thermal conductivity, such as a metal having a relatively high metal conductivity, to allow heat transfer from the other components (in particular, from the stator 1110) to the chassis arms 1142 of the chassis support 1140 through which wind can flow and have a cooling effect. Accordingly, in at least one embodiment, the bearing carrier 1130 is made of a material of high thermal conductivity with similar thermal properties. The channel 1164 and the through-openings 1144 may be collectively referred as "chassis support holes". Such chassis support holes may be located in the chassis support 1140 and the central axis (such as arm hole central axis 1544 for the through-openings 1144) of the chassis support holes is parallel (or approximately, or substantially parallel) to a direction of movement of the vehicle to allow airflow therethrough when the vehicle moves (is in the movement). As illustrated in FIG. 12, the chassis support holes may be located in a body of the chassis support and/or in a chassis arm. In at least one embodiment, the angle of the central axis of the chassis support holes may slightly vary as long as the angle allows the air to travel through the chassis support holes and allow the heat dissipation.

As already described above, the motor can be operated because in the rotor 1102, there is provided a stator 1110. The stator 1110 can be made of (in other words, may comprise) a plurality of successive layers, or stator plates 1111, all having the same shape and being sequentially layered one adjacent to another (each other) with the same geometrical features being aligned, as shown in FIG. 12 (i.e., the whole stator 1110 has the same shape (identical shape) when viewed from the front as an individual stator plate 1111, as each stator plate 1111 is assembled and installed with the same angular orientation as all others). Thus the stator plate may comprise a plurality of stator plates having identical shape and assembled with the same angular orientation with respect to the central longitudinal axis.

Each stator plate 1111 comprises a plurality of T-shaped peripheral arms 1112, each of the arms 1112 (i.e., the "vertical" portion of the T) extending radially away from a center of the stator (in other terms, from the central longitudinal axis 1201). The "horizontal" portion of a T-shaped peripheral arms 1112 is at the periphery of the stator plate 1111. The "horizontal" portion of adjacent T-shaped peripheral arms do not touch each other. In other terms, there is a spacing 1114 between adjacent arms of two adjacent T-shaped peripheral arms 1112 for accommodating the electrical winding 16. Each of the T-shaped peripheral arms 1112 extending radially away from the center longitudinal axis 1201, and each pair of adjacent T-shaped peripheral arms 1112 forms between them the spacing 1114 for the electrical winding 16. A processor of the computer 46 described herein is configured to control application of the electrical current to specific ones of the electrical winding 16 in order to actuate the interaction between the magnets 1124 and the electrical windings 16 to cause rotation of rotating portion 1500 with respect to the static portion 1501.

The "vertical" portion of the T of the T-shaped peripheral arms 1112 is used for winding a coil of electrical wire therearound, as shown in FIG. 3. The spacing 1114 between the "vertical" portion of the T of immediately adjacent T-shaped peripheral arms 1112 is used to accommodate such a winding. The winding is shown separately in FIG. 3, as including it in FIGS. 11-15 would make them hardly legible.

The stator 1110 is static and comprises elements to secure it to the bearing carrier and/or to the chassis support 1140, for example using the holes 1120 which can be aligned with the holes 1154 of the chassis support 1140 and with the holes 1134 of the bearing carrier 1130 when installed in the chassis support recess 1152 of the chassis support 1140, for common insertion of a screw, pin, or any other equivalent thereof to secure these parts together. Since the housing 1136 protrudes distally from the bearing carrier, the stator comprises a central opening 1113 which is large enough to accommodate the housing 1136 of the bearing carrier 1130, in addition to the rotating shaft 1180 at the center thereof and the bearing 1182 which is inserted in the housing 1136 of the bearing carrier 1130.

In an example, the stator plate may be made from one or more of: silicone steel, a composite material, a fiber glass, a temperature resistant type of plastic etc.

In an embodiment, the wheel assembly may also include a gear box for controlling the torque and rotation speed of the wheel which is attached to the rotation shaft 1180.

The rotor plates include a plurality of permanent magnets such that adjacent magnets of a given magnet have different polarities. Due to their position at or near the end of the rotor plates the magnets may have the shape of a trapezoid. In an embodiment, each magnet of each rotor plate corresponds in position to one of the coils. The coil winding in the stator generates a magnetic field across the surface of the stator plate for reacting with the permanent magnets in the rotors.

Using a controlled electric current and voltage, the coils provided in the stator 1110 are configured to radiate a magnetic field that pushes the adjacent magnet the rotor. A variety of configurations may be used for the coiling and types of electric currents fed into the coils. A suitable example may be regular 3 phase brushless.

Still referring to the stator 1110, the body of each stator plate 1111 is shaped such that it defines recesses or openings 1118 at a periphery of the central opening 1113, as well shown in FIGS. 12 and 15, the recesses or openings 1118 being shaped radially outwardly from the central opening 1113, with the concavity oriented inwardly toward the central opening 1113. In at least one embodiment, the radial extension (length) of the openings 1118 is limited in that the T-shaped peripheral arms 1112 are provided outwardly from the recesses or openings 1118, and the body of the stator plate 1111 is sufficient to support the T-shaped peripheral arms 1112. As illustrated in FIGS. 11 and 12, a portion of the body of the stator 1110 is provided between the recesses or openings 1118 and the T-shaped peripheral arms 1112.

As well shown in FIG. 15, for each stator plate 1111, there is a plurality of such recesses or openings 1118, each sequentially provided angularly adjacent to each other all around the periphery of the central opening 1113. This sequence may be interrupted to provide holes 1120, described above, as shown in FIG. 15. In the example of FIG. 15, there are five holes 1120 regularly angularly spaced apart to match the five bearing carrier arms 1132 of the bearing carrier 1130 (without limitation to five arms specifically), and between these five holes, there are provided five sets of three immediately adjacent openings 1118.

Figure 14:
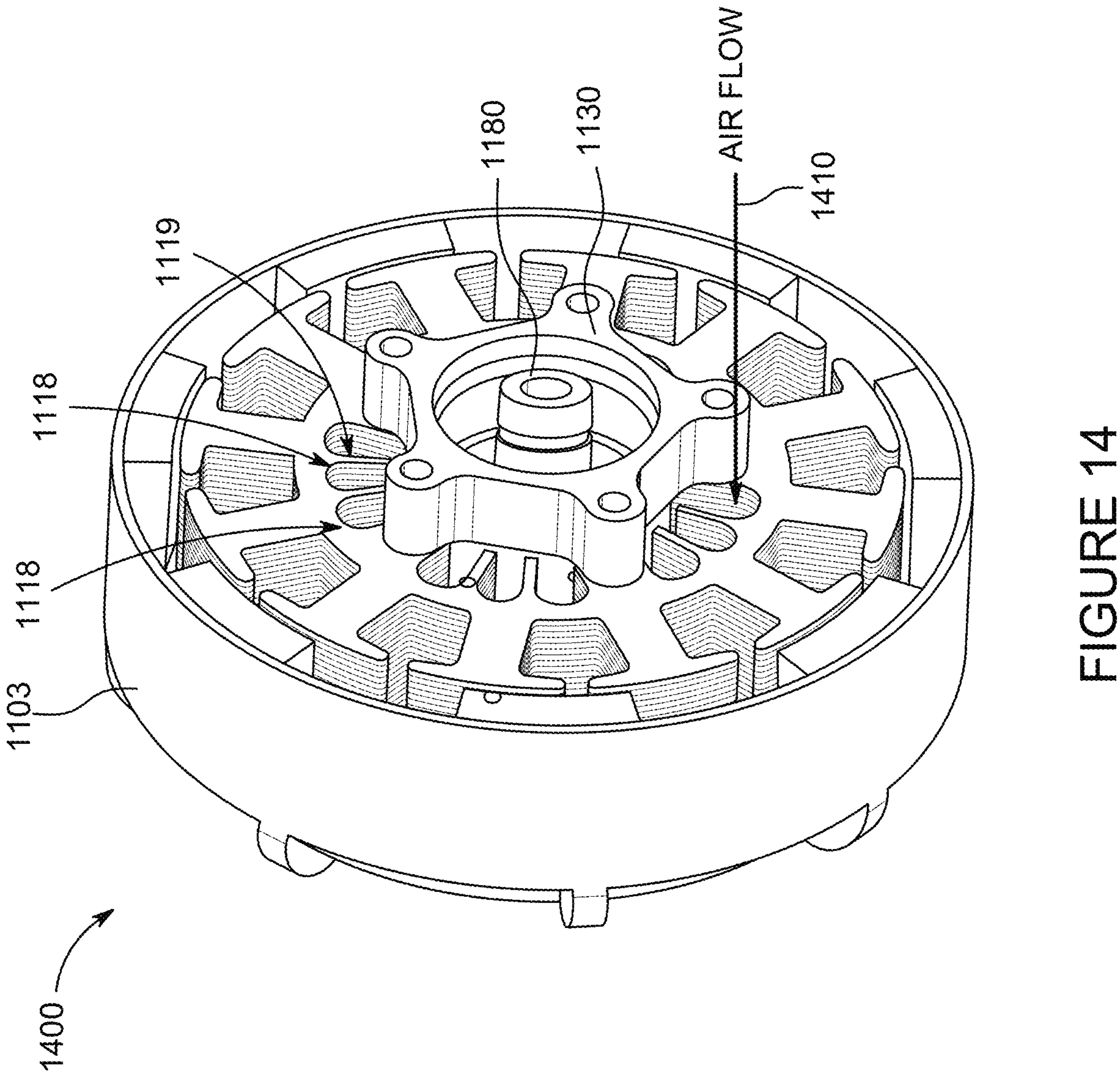
FIG. 14 is a perspective view of a portion of the advanced wheel assembly of FIG. 11, the portion comprising the rotor, a stator, magnets, a bearing carrier, and a rotative shaft, according to an embodiment.

The openings 1118 are used to force airflow through the motor assembly 1100 during its operation. Reference is now made to FIG. 11 or FIG. 14. Once all parts are assembled together, the openings 1118 are still unobstructed by either the bearing carrier 1130 or the chassis support 1140. The openings 1118 extend radially further away than the width of the bearing carrier 1130 or the chassis support 1140 to remain at least partially unobstructed, i.e., significantly unobstructed.

Figure 11:
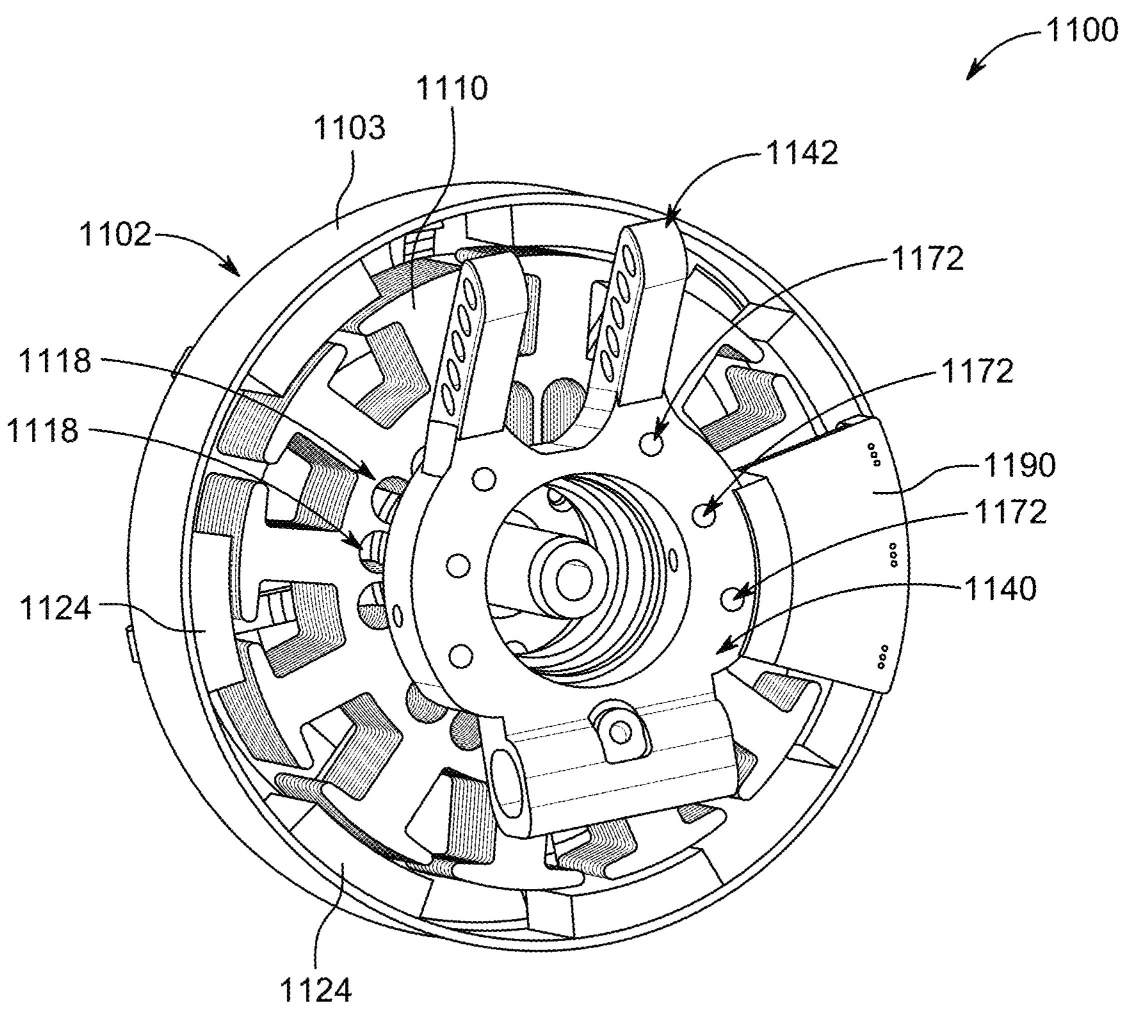
FIG. 11 is a perspective view of the advanced wheel assembly, in accordance with an embodiment.

FIG. 11 which shows the proximal side of the motor assembly 1100 and has, as the only unobstructed portions for air passage, the openings 1118. As a reminder, the space between magnets 1124 is occupied by other magnets (not shown for greater clarity) such that the magnets are provided interruptedly; the central bore 1170 of the chassis support is occupied by the bearing carrier 1130, and the spacing 1114 between the "vertical" portion of the T of immediately adjacent T-shaped peripheral arms 1112 is filled by electrical coils (winding). Therefore, FIG. 11 which shows the proximal side of the motor assembly 1100 provides longitudinal through openings 1118 as the only way for air passage. In at least one embodiment, these openings 1118 are located as close as possible to the axial center, and since the openings cannot be provided in the bearing carrier 1130, the openings are provided immediately radially away from the width or diameter of the bearing carrier 1130 and supporting portion of the chassis support 1140.

This is also shown in FIG. 14 which illustrates an assembly 1400 where the chassis support 1140 is removed from the motor assembly 1100 for greater visibility. In other words, when the chassis support 1140 with the bearing carrier 1130 are assembled with the stator 1110 in the motor assembly 1100, the air may circulate from one side of the stator 1110 to another side of the stator 1110 via the openings 1118, or at least the portions of the openings 1118 that are not covered by the chassis support 1140. To form such a portion, the outer radius $r_s$ of a middle body 1162 (or at least a middle body 1162) of the chassis support 1140 is smaller than the depth of the recess (opening) dr calculated from the central longitudinal axis 1201 of the motor assembly 1100 to a concave wall of the recess (opening), illustrated in FIGS. 16A, 16B.

In at least one embodiment, two adjacent recesses (openings) 1118 form an opening wall 1119 therebetween, which help in dissipation of the heat due to a larger surface that may transfer heat from the stator 1110 to the air. In at least one embodiment, the openings may be through-holes extending from one side of the stator to another side of the stator to allow an air flow through the openings from a stator proximal side 1220 (also referred to herein as a proximal side of the stator) to a stator distal side 1222 (also referred to herein as a distal side of the stator). As illustrated, in at least one embodiment, the opening wall 1119 of the stator is adjacent to the bearing carrier when the bearing carrier is mounted into (and/or fitted into, mounted within) the central opening 1113 of the stator 1110. In at least one embodiment, each opening 1118 is a recess extending from a central opening of the stator towards a periphery of the stator. In at least one embodiment, two adjacent openings 1118 form an opening wall 1119 therebetween and each opening is a recess extending radially from the central longitudinal axis. In at least one embodiment, the opening wall of the stator is adjacent to the bearing carrier.

Meanwhile, on the other side, i.e., distal side of the motor assembly (longitudinally outwardly from the vehicle chassis), as shown in FIG. 15, there is provided the cap or cover 1502. The cover 1502, as its name suggests, covers a surface over the rotor 1103. As shown in the example of FIG. 15, the cover 1502 covers a central area over the rotor 1102 and its diameter is as large as the maximum distance/diameter of opposed openings 1118 on the stator 1110, such that the cover 1502 covers the area under which the openings 1118 are provided; i.e., when the motor assembly 1100 is assembled, the central opening 1113 and the peripherally provided openings 1118 underly the corresponding surface area covered by the cover 1502.

As mentioned above, the rotor 1102 comprises spokes 1104. According to an embodiment, each of the spokes 1104 comprises a radial spoke portion 1215 which extends radially from the hub portion 1105 towards a spoke gap portion 1214. The radial spoke portions 1215 may be located in one plane or approximately one plane which is parallel (or substantially parallel) to the plane of a side of the stator 1110 (stator distal side 1222 which is parallel, or substantially parallel, to the stator proximal side 1220). The radial spoke portion 1215 may be located below the cover 1502 (in an embodiment with the cover 1506) and the cover 1502 may be clipped or otherwise secured onto the radial spoke portion 1215, in addition to being sandwiched by the nut 1506.

Each of the spokes 1104 (radial spoke portion 1215 of each spoke 1215) traverses the free space defined radially outwardly from the periphery of the cover 1502 between the periphery of the cover 1502 and the outer ring 1103. This free space (which is also referred to herein as a gap 1530) formed between the stator 1110 and the radial spoke portion 1215 and/or cover 1502 is the air exhaust of the air flow being forced through the motor assembly 1100. The height of the gap h formed by the spoke gap portion 1214 of the spoke 1104 is illustrated in FIG. 15. The spokes 1104 and outer ring 1103 form spoke apertures 1531 through which the air may circulate from the gap 1530 to the outside of the rotor 1102 to the distal side 1212 of the wheel assembly 1100 (also referred to herein as a "wheel assembly distal side" or a "motor assembly distal side"). In the embodiment with the cover 1502, the spoke apertures 1531 may be partially covered by the cover 1502 and form gap apertures 1532. Such gap apertures 1532 may be defined by the cover 1502, the outer ring 1103 and the spoke gap portion 1214, and, in some embodiments, partially by a portion of the radial spoke portion 1215. In other terms, the cover 1502 may be positioned coaxially with the rotor 1102 on a distal side of the rotor (coinciding with the distal side of the wheel assembly 1102) to cover an area about the central longitudinal axis 1201, the cover 1502, the spokes 1104 and the outer ring 1103 forming gap apertures 1532 for air exhaust on the distal side of the wheel assembly 1212 around a periphery of the cover 1502.

In at least one embodiment, the spokes and the outer ring form spoke apertures which at least partially coincide with the openings for air communication and exhaust from the wheel assembly. In at least one embodiment, each spoke comprises the radial spoke portion 1215 attached to and extending radially from the hub 1105 toward the outer ring 1103, and the spoke gap portion 1214 supporting the radial spoke portion 1215 and configured to form a gap 1530 between the stator and the hub with attached radial spoke portions attached to the hub.

The spokes 1104 contribute to the forced ventilation through this portion (gap 1530) of the motor assembly 1100, acting as straight wings that rotate. The form of the radial spoke portion 1215 of each of the spokes 1104 may have spoke surfaces 1534 (also referred herein as "first spoke surfaces") which may be flat, facing the direction of the movement of the vehicle (in other words, the spoke surfaces 1534 are perpendicular or approximately perpendicular to the movement of the vehicle). The rotation of the rotor 1102, including the rotation 1102 of the spokes 1104, creates a centrifugal force that pushes the air found within the motor assembly 1100 radially outwardly, away from an axial center thereof.

Therefore, the rotor 1102 in rotation with the spokes 1104 force the air to be pushed radially outwardly during the operation of the motor. An air flow should therefore be drawn from an axial center thereof. However, since the cover 1502 is installed onto the distal (longitudinally outward) side of the wheel assembly 1100, it prevents drawing up an air input from that side. This arrangement forces the air being drawn from the other side, i.e., the longitudinally inward or proximal side of the wheel assembly, where there is the chassis support 1140 and the bearing carrier 1130. The only portion allowing air entry is there, and it is the plurality of openings 1118.

In other words, the only place where air can be drawn into an axial center of the motor assembly 1100 is from the plurality of openings 1118, from the longitudinally inner side about the periphery of the bearing carrier 1130, as shown in FIG. 14 with an arrow 1410. During operation, an air flow is forced to be drawn/inputted from that portion of the motor assembly 1100, traverses said openings 1118 through the stator 1110 and exhausts through the free space of the rotor 1102, between the radial periphery of the cover 1502 and the outer ring 1103. This air flow exhaust is shown with an arrow 1550 in the semi-exploded view of FIG. 15.

This air flow contributes to heat dissipation using the forced air flow. Testing has shown that the temperature may be reduced from about 90° C., which would be achieved without such an air-flow arrangement, to about 60-70° C. It means that the motor assembly 1100 can be touched with bare hands without risking a burning injury. The through-holes 1444 in the chassis support 1140 also ensure heat dissipation from the chassis support 1140 and contribute to a reduction of the temperature by a few degrees.

The openings 1118 as described herein may be closed openings (through holes) in the stator 1110 and/or recesses 1118. In at least one embodiment, the recesses 1118 may have one side facing the central longitudinal axis 1201 open (without any wall). In some embodiment, such configuration with recesses improves circulation of the air around the bearing carrier 1130 when it is mounted in the central opening 1113 of the stator 1110, and therefore such configuration of the recesses 1118 helps even further to dissipate the heat around in the motor assembly 1100. In at least one embodiment, the bearing carrier provides an interface between the stator 1110 and the rotor 1102. The static portion of the bearing carrier 1130 is secured to a chassis support 1140. The chassis support comprises at least one chassis support hole 1142 or 1164 having chassis support hole axis (for example, axis 1544) being parallel to a direction of movement of the vehicle to allow airflow therethrough when the vehicle moves.

This arrangement advantageously ensures air flow through the stator 1110 itself, which is the component of the motor assembly 1100 undergoing the greatest heat generation because of the coils being located there. Ensuring a flow of air therethrough therefore cools down the stator 1110 directly, which is a very efficient way of dissipating heat despite using only the surrounding air to do so.

Referring again to FIGS. 11-16B, in at least one embodiment, the wheel assembly 1100 comprises a stator 1110, which comprises a spacing 1114 for receiving an electrical winding 16 (illustrated, for example, in FIG. 3). The wheel assembly 1100 also comprises a rotor 1102 defining an outer ring 1103. The rotor 1102 houses the stator 1110 for relative rotation around the stator 1110. The rotor comprises magnets 1124, 12 for interacting with the electrical winding 16 to provide the relative rotation about a central longitudinal axis 1201. The stator 1110 comprises openings 1118 extending from a stator proximal side 1220 to a stator distal side 1222. The rotation of the rotor 1102 around the stator 1110 causes an air flow through the openings 1118 for heat dissipation. As illustrated in FIGS. 14-15 with arrows 1410 and 1550, in at least one embodiment, the air flows from the wheel assembly 1100 proximal side 1210 towards the wheel assembly distal side 1212 through the openings 1118.

In at least one embodiment, the rotor 1102 defines a hub 1105 and spokes 1104 extending from said hub 1105. As illustrated in the example of FIG. 13, the spokes 1104 are distant (between each other) to provide openings (also referred herein as spoke apertures 1531) from which the air flows during rotation. In other words, the air flows though the spoke apertures 1531 located between the spokes 1104 to provide heat dissipation.

In at least one embodiment, rotation of the spokes 1104 creates (in other words, generates or results in) a centrifugal force that pushes the air found (located) within the motor assembly 1100 radially outwardly, away from an axial center thereof. In some embodiments, the wheel assembly 1100 further comprises a cover 1502 which covers at least the hub 1106, and defines a free space with the rotor 1102 such that the air flow is forced to traverse through the stator 1110 and to be exhausted through the free space (also referred to as a gap 1530 and illustrated in FIG. 15) between the cover 1502 and the rotor 1102. In an embodiment with the cover 1502, such free space is provided by a combination of the gap 1530 and the portion of the gap apertures 1531 not covered by the cover 1502 (illustrated as gap apertures 1532 in FIG. 15).

The wheel assembly may further comprise an arm 1142 for connecting the stator 1110 to the chassis of a vehicle, the arm having through-openings along a longitudinal axis which is parallel to a movement direction of the vehicle to force air through the through-openings for additional heat dissipation from the stator.

In at least one embodiment, a vehicle having the wheel assembly comprises a chassis, the wheel assembly attached to the chassis, and the processor configured to drive electric current to the electrical winding of the at least one wheel assembly for controlling rotation of the wheel assembly.

In an exemplary non-limiting embodiment, the wheel assembly may be configured to cause an air flow from the distal side 1212 towards the proximal side 1210, which is in the reverse direction as the main embodiment. This embodiment is particularly useful for reverse rotation when the rotation speed is negligible (when for example, the wheel assembly is installed in a domestic vehicle, and the reverse speed/reverse rotation of the wheel is not high enough), and thus, the centrifugal force that causes the air to be pulled out of the wheel assembly is also not high enough. According to this embodiment, it is possible to orient the surface of the spokes 1104 in a given angle such that in a given direction of rotation of the rotor 1102, the air is scooped from the outside of the wheel assembly 1100 and pushed towards the inside of the opening 1118 towards the proximal side 1210 of the wheel assembly 1100, and therefore towards the vehicle. In this embodiment, one of the spoke's surfaces that corresponds to the reverse rotation (for example, the second spoke surface 1535) may be shaped to define an angle (or angles) such that in the reverse rotation of the wheel (and the wheel assembly 1100), the air may be shoved towards the inside of the wheel assembly (inside the gap 1530 and then, through the openings 1118 towards the vehicle). The air may be thus scooped from the outside of the wheel assembly 1100 and towards the vehicle 40. In other words, in some wheel assemblies, when the wheel assembly rotates in one of the directions (for example, in the reverse mode), the spokes 1104 may have one surface (1534 or 1535) that allows to scoop (suck) the air and push the air inside the vehicle, for example, for cooling the wheel assembly and, in particular, the stator 1110. In the present example, the other surface of the spoke that corresponds to the forward rotation can remain as described and as shown above.

In some embodiments, for example in domestic vehicles, it may be possible to orient an angle of one side of the spokes (in other terms, an angle of one spoke surface 1534 or 1535) to scoop the air inside the wheel assembly when the vehicle is in, for example, the reverse mode, while the other side (surface) of the spokes 1104 may have an angle approximately perpendicular to the rotor outer ring 1103 and facing the forward movement of the vehicle (as illustrated in FIG. 15) to encourage the air to exit the wheel assembly (as illustrated with the arrow 1550 in FIG. 15 and as described above) when the vehicle is moving forward. In other terms, one of the spoke surfaces 1534, 1535 of each spoke 1104 may be perpendicular to the outer ring 1103 and facing one direction of the movement of the vehicle, and the other surface of the spoke may be oriented at an angle different from 90 degrees to help bring outside air into the gap 1530 and then to the openings 1118 when the vehicle is moving in another direction (for example, moving backward, in other words, in a reverse mode). For example, the spoke surface that faces the direction of the reverse movement of the vehicle, and when the vehicle's speed may be expected to be, for example, relatively slow (compared to the forward movement of the vehicle) may be oriented at an angle other than 90 degrees (for example, between 80 and 60 degrees) to the outer ring 1103 to help scoop the air into the gap 1530 and through the openings 1118 towards the proximal side 1210 of the motor assembly 1100.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A wheel assembly comprising:

a stator comprising a spacing for accommodating an electrical winding; and a rotor having an outer ring and spokes extending from a hub, the rotor housing the stator for relative rotation with respect to the stator, the rotor comprising magnets for interacting with the electrical winding to provide the relative rotation about a central longitudinal axis, the central longitudinal axis extending from a wheel assembly proximal side to a wheel assembly distal side;

wherein the stator comprises openings extending from a stator proximal side to a stator distal side, to allow an air flow through the openings, and wherein the spokes and the outer ring form spoke apertures, the spoke apertures at least partially coinciding with the openings of the stator and the windings for air communication and exhaust from the wheel assembly.

2. The wheel assembly of claim 1, wherein each spoke of the spokes comprises a radial spoke portion attached to and extending radially from the hub toward the outer ring, and a spoke gap portion, the spoke gap portion supporting the radial spoke portion and configured to form a gap between the stator and the hub with attached radial spoke portions attached to the hub.

3. The wheel assembly of claim 1, further comprising a cover positioned coaxially with the rotor on a distal side of the rotor to cover an area about the central longitudinal axis, the cover, the spokes and the outer ring forming gap apertures for air exhaust on the distal side around a periphery of the cover.

4. The wheel assembly of claim 1, further comprising a bearing carrier at an interface between the stator and the rotor, a static portion of the bearing carrier being secured to a chassis support of a vehicle, the chassis support comprising at least one chassis support hole having a chassis support hole axis being parallel to a direction of movement of the vehicle to allow airflow therethrough when the vehicle moves.

5. The wheel assembly of claim 4, wherein the chassis support comprises at least one chassis arm having the at least one chassis support hole.

6. The wheel assembly of claim 4, wherein at least one of the at least one chassis support hole is located in a body of the chassis support.

7. The wheel assembly of claim 4, wherein an outer radius of a middle body of the chassis support is smaller than a depth of the opening calculated from the central longitudinal axis of the wheel assembly.

8. The wheel assembly of claim 1, wherein the stator comprises a plurality of T-shaped peripheral arms, each of the T-shaped peripheral arms extending radially away from the central longitudinal axis, and each pair of adjacent T-shaped peripheral arms forming, between them, the spacing for the electrical winding.

9. The wheel assembly of claim 1, wherein the stator comprises a plurality of stator plates having identical shape and assembled with the same angular orientation with respect to the central longitudinal axis.

10. The wheel assembly of claim 1, wherein each opening of the openings is a recess extending from a central opening of the stator towards a periphery of the stator.

11. The wheel assembly of claim 1, wherein two adjacent openings form an opening wall therebetween and each opening is a recess extending radially from the central longitudinal axis.

12. The wheel assembly of claim 11, further comprising a bearing carrier mounted within a central opening of the stator, wherein the opening wall of the stator is adjacent to the bearing carrier.

13. A wheel electric engine comprising the wheel assembly of claim 1, further comprising a processor configured to drive electric current to the electrical winding.

14. A wheel assembly comprising:

a stator comprising a spacing for receiving an electrical winding;

a rotor defining an outer ring, the rotor housing the stator for relative rotation around the stator, the rotor comprising magnets for interacting with the electrical winding to provide the relative rotation about a central longitudinal axis, the rotor defining a hub and spokes extending from said hub, the spokes being distant to provide openings from which the air flows during rotation; and a cover covering at least the hub, and defining a free space with the rotor such that the air flow is forced to traverse through the stator and to be exhausted through the free space between the cover and the rotor;

wherein the stator comprises openings extending from a stator proximal side to a stator distal side; and wherein rotation of the rotor around the stator causes an air flow through the openings for heat dissipation.

15. The wheel assembly of claim 14, wherein the air flows from the wheel assembly proximal side towards the wheel assembly distal side through the openings.

16. The wheel assembly of claim 14, wherein rotation of the spokes creates a centrifugal force that pushes the air found within the wheel assembly radially outwardly, away from an axial center thereof.

17. The wheel assembly of claim 14, further comprising an arm for connecting the stator to a chassis of a vehicle, the arm having through-openings along a longitudinal axis which is parallel to a movement direction of the vehicle to force air through the through-openings for additional heat dissipation from the stator.

18. The wheel assembly of claim 17, wherein the rotor comprises spokes extending from a hub, and wherein the spokes and the outer ring form spoke apertures, the spoke apertures at least partially coinciding with the openings of the stator and the windings for air communication and exhaust from the wheel assembly.

19. The wheel assembly of claim 17, further comprising a bearing carrier, wherein two adjacent openings of the stator form an opening wall therebetween and each opening is a recess extending radially from the central longitudinal axis, wherein the bearing carrier is mounted within a central opening of the stator and the opening wall of the stator is adjacent to the bearing carrier.

20. The wheel assembly of claim 17, further comprising a bearing carrier at an interface between the stator and the rotor, a static portion of the bearing carrier being secured to a chassis support of a vehicle, the chassis support comprising at least one chassis support hole having a chassis support hole axis being parallel to a direction of movement of the vehicle to allow airflow therethrough when the vehicle moves.

21. A vehicle comprising:

a chassis;

at least one wheel assembly comprising:

a stator comprising a spacing for receiving an electrical winding;

a rotor defining an outer ring, the rotor housing the stator for relative rotation around the stator, the rotor comprising magnets for interacting with the electrical winding to provide the relative rotation about a central longitudinal axis; the rotor defining a hub and spokes extending from said hub, the spokes being distant to provide openings from which the air flows during rotation; and a cover covering at least the hub, and defining a free space with the rotor such that the air flow is forced to traverse through the stator and to be exhausted through the free space between the cover and the rotor;

wherein the stator comprises openings extending from a stator proximal side to a stator distal side; and wherein rotation of the rotor around the stator causes an air flow through the openings for heat dissipation; and a processor configured to drive electric current to the electrical winding of the at least one wheel assembly for controlling rotation of the at least one wheel assembly.

* * * * *